US008938350B2

(12) United States Patent
Silvers et al.

(10) Patent No.: US 8,938,350 B2
(45) Date of Patent: Jan. 20, 2015

(54) SKIP FIRE FUEL INJECTION SYSTEM AND METHOD

(75) Inventors: Brad Silvers, Plainfield, IL (US); Reddy Pocha Siva Sankara, Lisle, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 412 days.

(21) Appl. No.: 13/485,239

(22) Filed: May 31, 2012

(65) Prior Publication Data

US 2013/0006497 A1 Jan. 3, 2013

Related U.S. Application Data

(60) Provisional application No. 61/502,634, filed on Jun. 29, 2011.

(51) Int. Cl.

| | |
|---|---|
| ***B60T 7/12*** | (2006.01) |
| ***F02D 41/00*** | (2006.01) |
| ***F02D 41/30*** | (2006.01) |

(52) U.S. Cl.

CPC ........ *F02D 41/0087* (2013.01); *F02D 41/3058* (2013.01)

USPC ............................ 701/103; 701/105; 701/115

(58) Field of Classification Search

CPC .. F02D 41/40; F02D 41/3058; F02D 41/2422

USPC ................................. 701/103–105, 114, 115

See application file for complete search history.

(56) References Cited

U.S. PATENT DOCUMENTS

| | | | | |
|---|---|---|---|---|
| 5,740,783 | A * | 4/1998 | Learman et al. | 123/497 |
| 6,289,881 | B1 * | 9/2001 | Klopp | 123/525 |
| 6,784,565 | B2 * | 8/2004 | Wall et al. | 290/52 |
| 6,920,761 | B2 * | 7/2005 | Laper | 60/772 |
| 7,392,129 | B2 * | 6/2008 | Hill et al. | 701/105 |
| 7,542,842 | B2 * | 6/2009 | Hill et al. | 701/105 |
| 7,945,372 | B2 * | 5/2011 | Geveci et al. | 701/103 |
| 2010/0145597 | A1 * | 6/2010 | Keegan et al. | 701/106 |

* cited by examiner

*Primary Examiner* — John Kwon

(74) *Attorney, Agent, or Firm* — Finnegan, Henderson, Farabow, Garrett & Dunner LLP

(57) ABSTRACT

A system is disclosed for controlling fuel injectors in an internal combustion engine having a plurality of individual engine cylinders with associated pistons. The system includes at least one electronic engine control module configured to control the fuel injectors and having a memory with predetermined injector firing patterns stored therein. The firing patterns specify the fuel injectors to be fired and the fuel injectors to be skipped, in an engine cycle under conditions of reduced power demand. For each engine cycle in a succession of cycles under the reduced power demand condition, the engine control module determines the number of fuel injectors to be fired based upon the reduced power demand data, selects from the stored predetermined firing patterns a firing pattern specifying the injectors to be fired and the injectors to be skipped, and orders the specified fuel injectors to be fired sequentially in accordance with the selected predetermined firing pattern.

20 Claims, 7 Drawing Sheets

| 16 CYLINDER | |
|---|---|
| FIRING ANGLE | FIRING ORDER |
| 0 | 1 |
| 22.5 | 8 |
| 45 | 9 |
| 67.5 | 16 |
| 90 | 3 |
| 112.5 | 6 |
| 135 | 11 |
| 157.5 | 14 |
| 180 | 4 |
| 202.5 | 5 |
| 225 | 12 |
| 247.5 | 13 |
| 270 | 2 |
| 292.5 | 7 |
| 315 | 10 |
| 337.5 | 15 |

*FIG. 3*

SKIP FIRE FUEL INJECTION SYSTEM AND METHOD

Applicant claims priority to Provisional Application No. 61/502,634, filed Jun. 29, 2011, the entire contents of which are hereby incorporated by reference.

TECHNICAL FIELD

The present disclosure generally relates to a system and method for controlling fuel injectors in an internal combustion engine and, more specifically, to a system and method for controlling emissions from a fuel-injected internal combustion engine and injector wear.

BACKGROUND

The exhaust gases released into the atmosphere by an internal combustion engine, include particulates, nitrogen oxides ($NO_X$) and other pollutants. Legislation has been passed to reduce the amount of pollutants that may be released into the atmosphere. See e.g., the Environmental Protection Agency's (EPA) Tier II (40 C.F.R. 92), Tier III (40 C.F.R. 1033), and Tier IV (40 C.F.R. 1033) emission requirements, as well as the European Commission (EURO) Tier IIIb emission requirements. While this problem exists for all internal combustion engines, it is especially pronounced in two-stroke engines, particularly diesel engines, but also gasoline-burning two-stroke engines.

Systems such as catalytic exhaust systems and exhaust filter systems to control the scavenging and mixing processes in the cylinder have been implemented which reduce these pollutants, but at the expense of fuel efficiency. Moreover, such traditional solutions do not address problems with the fuel injection systems such as increased injector fouling tendency and the premature wearing of the injectors, due to the continued presence of particle matter in each cylinder for each cycle of engine operation. The present disclosure is intended to address these problems, as well as the emissions problem.

SUMMARY

In one aspect of the present disclosure, a system is described for controlling fuel injectors in an internal combustion engine having a plurality of individual engine cylinders with associated pistons. The pistons are operatively interconnected to a crankshaft, and the cylinders further include a plurality of respective fuel injectors. The system includes at least one electronic engine control module configured to control the fuel injectors and having a central processing unit and an associated memory. The system also includes one or more predetermined injector firing patterns stored in the engine control module memory. The firing patterns relate to a number of fuel injectors to be fired, and specify the fuel injectors to be fired and the fuel injectors to be skipped, in an engine cycle under conditions of reduced power demand relative to a predetermined full power level. The engine control module is programmed to be responsive to data indicative of a reduced power demand condition during engine operation. Further, for each engine cycle in a succession of cycles under the reduced power demand condition, the engine control module is programmed to determine the number of fuel injectors to be fired based upon the reduced power demand data. The engine control module also is programmed to select from the stored predetermined firing patterns, a firing pattern specifying the injectors to be fired and the injectors to be skipped in a given engine cycle, based on the number of injectors to be fired. The engine control module is further programmed to order the specified fuel injectors to be fired sequentially in accordance with the selected predetermined pattern, which firing pattern is different from that for the immediately previous engine cycle.

In another aspect of the present disclosure, a method is described for controlling fuel injectors in an internal combustion engine, the engine having a plurality of individual engine cylinders with associated pistons, the pistons being operatively interconnected to a crankshaft, and the cylinders further including respective fuel injectors. The method includes providing at least one electronic engine control module for controlling the fuel injectors. The engine control module has a central processing unit and an associated memory, and the providing includes storing in the engine control module memory, one or more predetermined injector firing patterns relating to a number of fuel injectors to be fired, and specifying the fuel injectors to be fired and the fuel injectors to be skipped, in an engine cycle under conditions of reduced power demand relative to a predetermined full power level. The method further includes monitoring engine power demand during operation for a reduced power demand condition and providing data thereof to the engine control module. The method still further includes, for each engine cycle in a succession of cycles under the reduced power demand condition, the engine control module determining the number of fuel injectors to be fired based upon the reduced power demand data. Based on the number of injectors to be fired, the method also includes the engine control module selecting from the stored predetermined firing patterns, a firing pattern specifying the injectors to be fired and the injectors to be skipped in a given engine cycle. The selected firing pattern is different from that for an immediately previous engine cycle. The method further includes the engine control module ordering the specified fuel injectors to be fired sequentially in accordance with the selected predetermined pattern,

BRIEF DESCRIPTION OF THE DRAWINGS

FIG. 3 is a table showing the sequence of firing, or skipping, the injectors for the cylinders of FIG. 2.

DESCRIPTION OF THE DISCLOSED EMBODIMENTS

The present disclosure is directed to a skip fire fuel injection system and method for use in an internal combustion engine to reduce pollutants, namely particulate matter and $NO_X$ emissions released from the engine, while achieving desired fuel economy and reduced fuel injector fouling and wear. The disclosed system and method may advantageously be applied to two-stroke diesel engines having various numbers of cylinders (e.g., 8 cylinders, 12 cylinders, 16 cylinders, 18 cylinders, 20 cylinders, etc.). The disclosed system and method may further be applied to two-stroke diesel engine applications other than for the locomotive application discussed hereinafter (e.g., for marine applications, non-moving power generation applications, etc.), as well as gasoline-powered two-stroke engines. Still further, the disclosed system and method may also be applied to four-stroke fuel injected gasoline engines. The fuel injected engines may have a V-shaped (banked) or an in-line cylinder configuration, including configurations with an odd number of cylinders.

Figure 1:
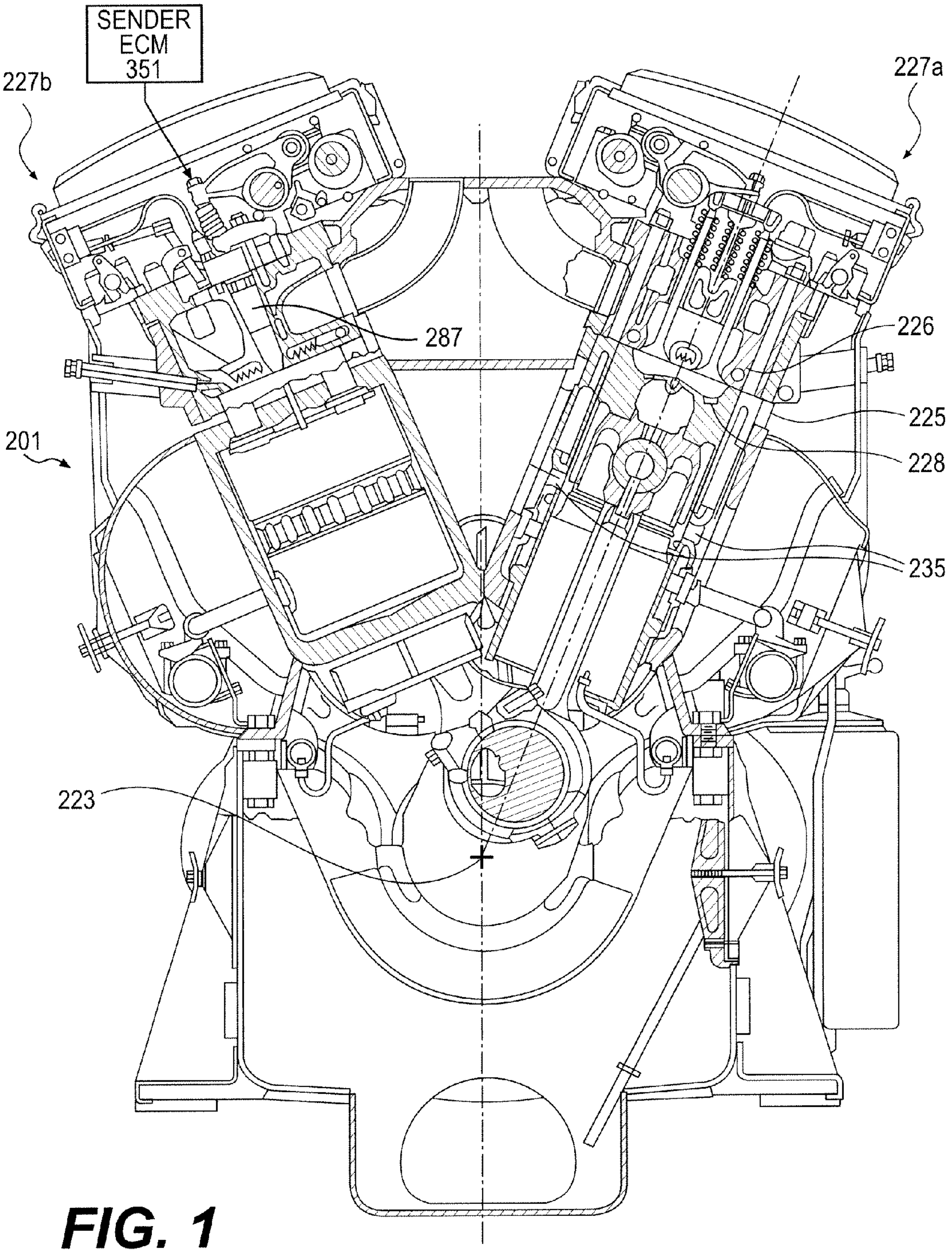
FIG. 1 is a cross-sectional view of a sixteen (16) cylinder two-stroke locomotive diesel engine having a fuel injector control system in accordance with the present disclosure.

FIG. 1 illustrates a two-stroke locomotive diesel engine 201 suitable for application of the presently disclosed control system and method. Engine 201 has two cylinder banks 227*a*, 227*b*, each having eight cylinders 225 closed by respective cylinder heads 226. Each cylinder 225 also includes a corresponding fuel injector 287 for introducing fuel into the cylinders 225 for combustion. The fuel injectors 287 are generally controlled to inject a precise amount of fuel into the cylinders 225, by a controlled injector pulse width and/or by controlled fuel delivery pressure. Generally, a fuel injector assembly is mounted to the cylinder head 226 and includes a fuel injector 287 positioned therein such that a spray tip of the fuel injector 287 extends into an engine cylinder 225. The fuel injector 287 may be secured to the cylinder head 226 by a clamp. Although a single unit pump fuel delivery system is shown, wherein fuel delivery pressure and thus flow rate could be modulated to the injectors individually, a common rail fuel delivery system may also be used. The cylinders 225 have respective pistons 228 operatively connected to crankshaft 223, as is known.

Fuel injected into each cylinder is mixed and combusted with cooled charge air from the compressor. The combustion cycle of a diesel engine generally includes, what is referred to as, scavenging and mixing processes. During the scavenging and mixing processes, a positive pressure gradient is maintained from the intake port of the airbox to the exhaust manifold such that the cooled charge air from the airbox charges the cylinders 225 and scavenges most of the combusted gas from the previous combustion cycle. More specifically, during the scavenging process in the power assembly, cooled charge air enters one end of a cylinder 225 controlled by an associated piston 228 and intake ports 235. The cooled charge air mixes with a small amount of combusted gas remaining from the previous cycle. At the same time, the larger amount of combusted gas exists the other end of the cylinder 225 via exhaust valves and enters the exhaust manifold as exhaust gas.

In conventional fuel injection systems, each fuel injector is associated with an engine control module (ECM), which controls firing of that fuel injector. An ECM is generally capable of controlling up to 8 injectors. Accordingly, for diesel engines of e.g., 12, 16, and 20 cylinders, multiple ECMs typically are required. For medium-speed engines, such as the two-stroke, 16 cylinder locomotive diesel engine shown in FIG. 1, the ECMs must operate in a coordinated fashion and in real-time, where the time between initiations of fuel injection events may be as short as about 4 mS.

Reduction in particulate emission may further be realized in accordance with systems and methods of the present disclosure by controlling the number of fuel injectors firing during each engine cycle. Specifically, in the locomotive diesel engine embodiment illustrated in FIGS. 1 through 4, a control system designated generally by the numeral 300 is provided to control injector firing in engine 201 using two engine control modules (ECMs) 351, 353, via a communications network 350. While two ECMs are depicted, one skilled in the art would understand more ECMs could be employed, depending on the number of cylinders and capacity of the individual ECMs. Also, in other embodiments, in accordance with the present disclosure, a single ECM may be provided if configured to control all the injectors.

Figure 2:
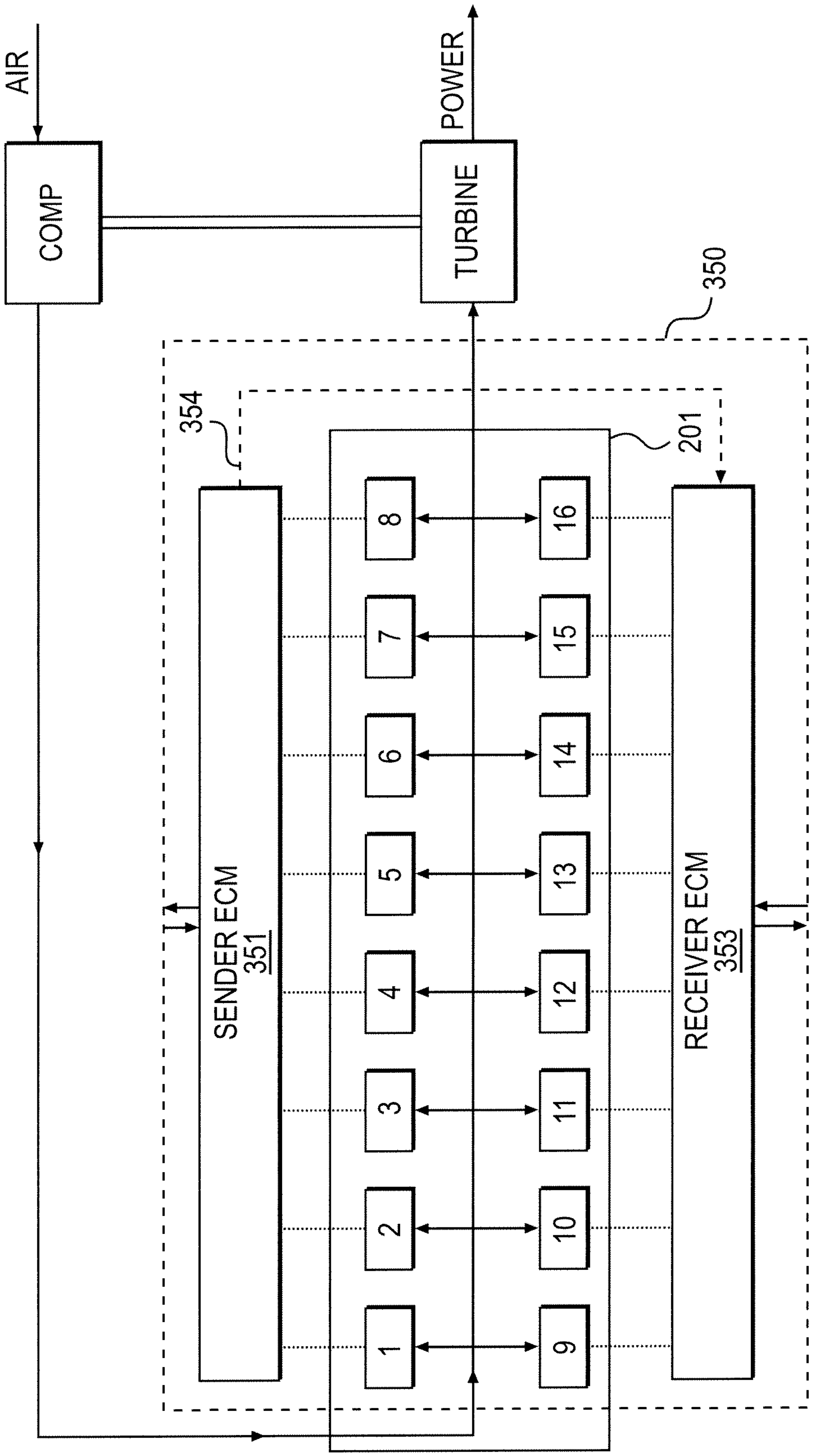
FIG. 2 is a schematic depiction of the fuel injector control system for the cylinders of the engine in FIG. 1.

In the locomotive embodiment, the control system 300 includes two ECMs, a Sender ECM 351 and a Receiver ECM 353, each being adapted to monitor and control a respective set of eight (8) fuel injectors in response to engine data, including power demand data, provided by locomotive control computer (LCC) 340. The ECM may be further configured to perform the functions of a separate engine control computer. FIG. 2 shows schematically the interconnections of Sender ECM 351 and Receiver ECM 353 with the respective cylinder injectors. The table in FIG. 3 presents the relationship of the firing angle and the sequential firing order for the injectors in the 16 cylinder diesel engine depicted in FIGS. 1 and 2. The LCC 340 may be adapted to send engine power demand data and a desired engine speed (RPM) to the Sender ECM 351. In response thereto, the Sender ECM 351 determines the total number of injectors to be fired and the total number of injectors to be skipped. The Sender ECM 351 may also calculate the fuel delivery rate.

The Sender ECM 351 is further adapted to determine the specific fuel injectors that are to be fired and/or skipped, in a given engine cycle, that is, the appropriate firing/skipping pattern. The Sender ECM 351 may further be adapted to communicate such information to the Receiver ECM 353 (e.g., in the form of injection control commands 354). The Sender ECM 351 also is adapted to determine the firing angles at which the specified engine fuel injectors are to fire and be responsive to angular position data (e.g. from crankshaft 223), as illustrated in FIG. 1. In response to a command from its respective ECM that the proper firing angle has been reached, each of the fuel injectors is controlled to inject a select amount of fuel at a select rate into its respective cylinder for combustion.

Figure 4:
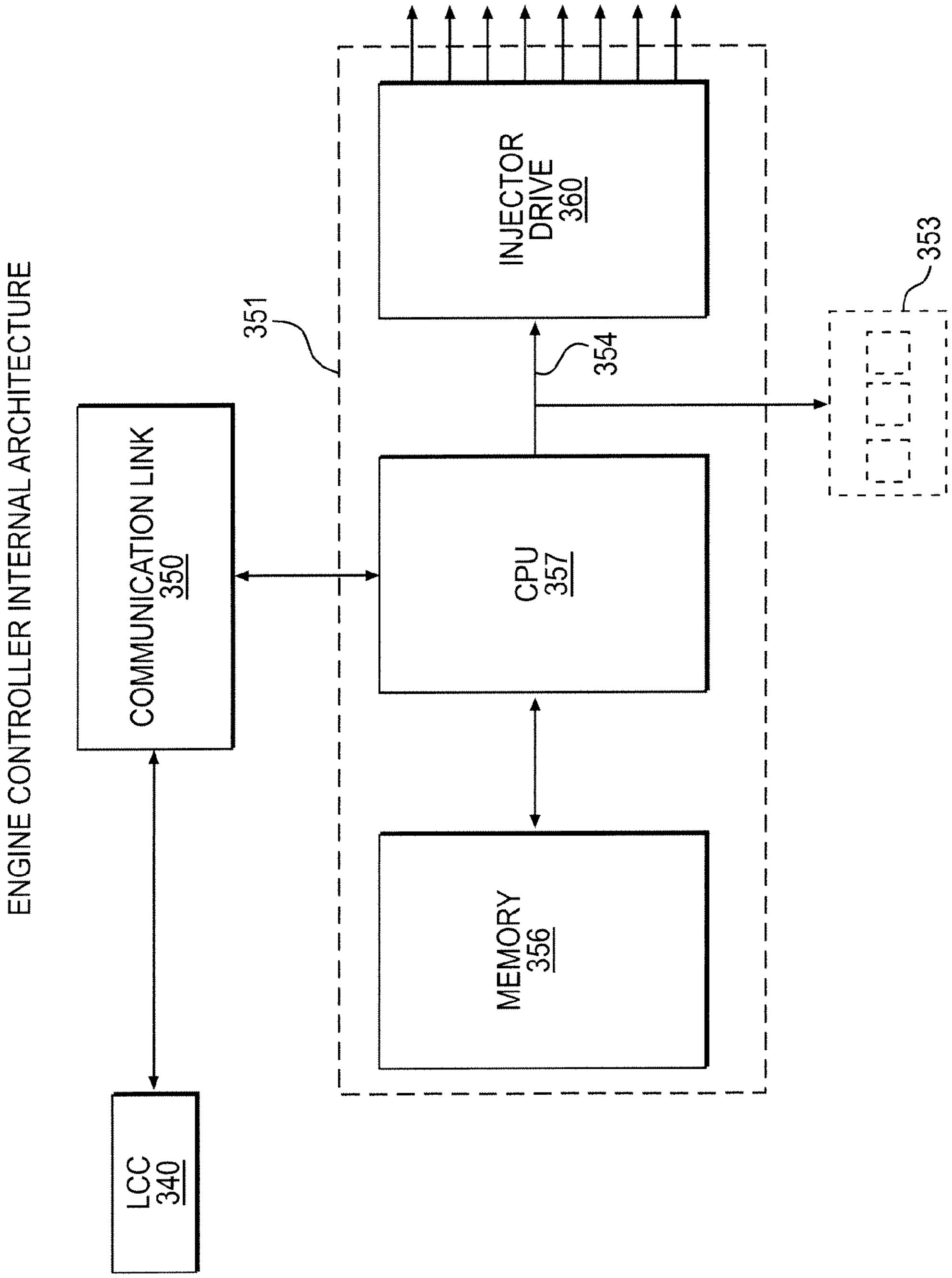
FIG. 4 is a schematic of the architecture of the Sender Engine Control Module ("ECM") of the system in FIG. 2.

As best shown in FIG. 4, the Sender ECM 351 may include a communications link 350 for transmitting and receiving data and commands from the LCC 340. Receiver ECM 353 is configured similarly, but receives data and commands from ECM 351. Data from the communications link 350 is processed at a CPU 357 using processing instructions or algorithms stored in the memory location 356. Processed data and/or commands (e.g., injection control commands 354) are routed to each individual injector via an injector driver 360.

Figure 5:
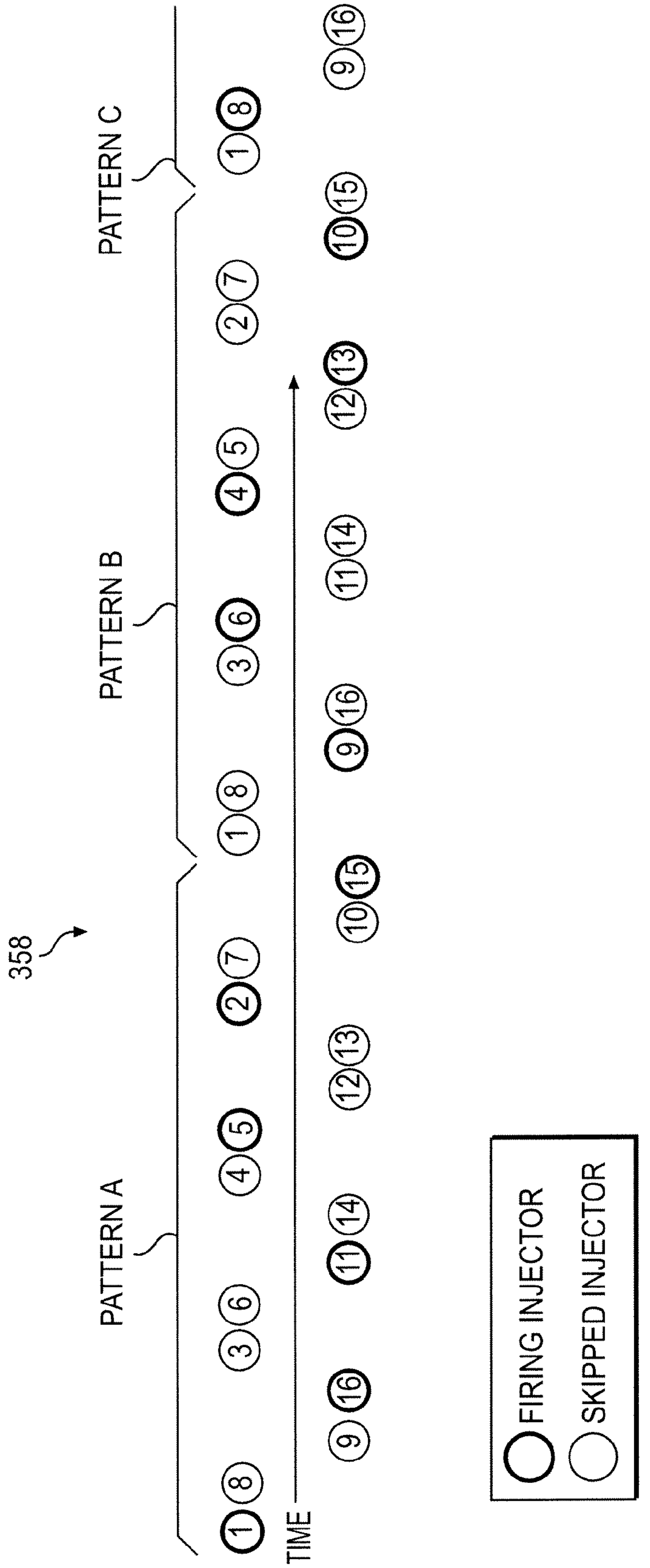
FIG. 5 is a diagram of a rotating firing/skipping pattern for the injector control system in FIG. 2.

In one example as illustrated in FIG. 5, in response to received data and/or a command from the LCC signaling a reduced power demand, the Sender ECM 351 has determined that only every third cylinder is to be fired. Accordingly, the Sender ECM 351 and Receiver ECM 353 coordinate the firing of one injector, followed by the skipping of two subsequent injectors by selecting a firing pattern, or set of patterns, specifying the particular injectors to be fired and the particular injectors to be skipped, in a given cycle and in the sequence set forth in FIG. 3. Such patterns based on the total engine injectors to be fired and total injectors to be skipped may be predetermined and stored in the memory 356 of Sender ECM 351. For the 16 cylinder engine depicted in FIG. 5, a continuously rotating fire/skip set of patterns 358 is selected, which set of patterns A, B, and C, repeats every 3 engine cycles (revolutions). For engines with a different number of cylinders, a rotating fire/skip pattern may repeat after a different number of cycles.

More specifically, as illustrated in FIG. 5 by the set of patterns 358, in the first engine revolution, the skip/fire pattern (Pattern A), may have the following firing order: 1, 16, 11, 5, 2, 15 (wherein cylinders 8, 9, 3, 6, 14, 4, 12, 13, 7 and 10 are skipped). In the second engine revolution, the skip/fire pattern (Pattern B) may include the following firing order: 9, 6, 4, 13, 10 (wherein 1, 8, 16, 3, 11, 14, 5, 12, 2, 7, and 15 are skipped). In the third engine revolution, the skip/fire pattern (Pattern C), (only partially shown, for clarity) may include the following firing order: 8, 3, 14, 12, 7 (wherein, 1, 9, 16, 6, 11, 4, 5, 13, 2, 10 and 15 are skipped). At the conclusion of the third cycle, the skip/fire pattern finishes its rotation through the cylinders and begins again with Pattern A. In this rotating pattern, different injectors fire in each fuel injection cycle, such that the same fuel injectors are not used in consecutive cycles. As a result, the wear on the fuel injectors, resulting from firing, is spread across all fuel injectors in the engine.

Also, as discussed above, the Sender ECM 351 may be adapted to determine the firing angle of the engine cycle at which an individual fuel injector is to fire. Accordingly, fuel injection firing is determinate on engine rotation (crankshaft angle) rather than time. For example, at 1000 RPM, the engine rotates every 60 mS, and a fuel injector fires every 3.75 mS.

As discussed above, the Sender ECM 351 determines a fuel injection firing pattern based on data it processes from the LCC 340. In order to synchronize the firing rate and pattern with the Receiver ECM 353, the Sender ECM 351 transfers fuel delivery rate information as well as fuel injection firing pattern information whenever a select number of cylinders fire. Moreover, the Sender ECM 351 and Receiver ECM 353 may be adapted or programmed to change their fuel delivery rate and fuel injection firing pattern only when a select number of engine cycles or select number of fuel injection firing patterns have been completed. In such a way, the Sender ECM 351 and Receiver ECM 353 may be synchronized in order to ensure that the proper fuel delivery rate and fuel injection firing pattern are used.

Figure 6:
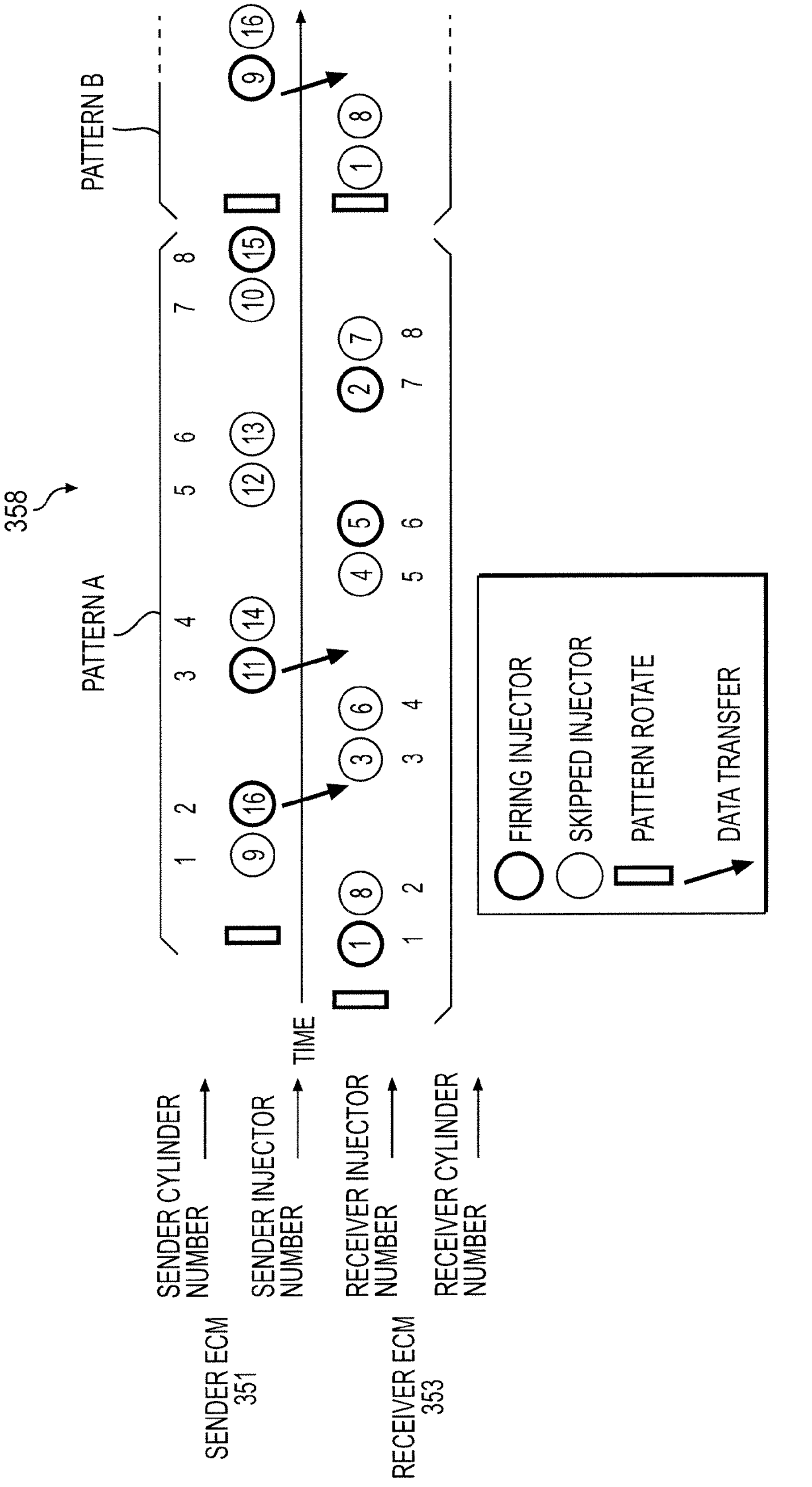
FIG. 6 is a schematic illustrating the synchronization of the firing/skipping of the injectors controlled by the Sender ECM and Receiver ECM of the system of FIG. 2.

In the synchronization method shown in FIG. 6, when implementing a “fire one, skip two” rotating set of patterns 358, the Sender ECM 351 transfers fuel delivery rate information as well as fuel injection firing pattern information whenever the first four of the Receiver-controlled cylinders (i.e. cylinders nos. 1, 8, 3, and 6) have fired or skipped in Pattern A. Moreover, the Sender ECM 351 and Receiver ECM 353 are adapted or programmed to change their fuel injection firing pattern after the fifth through the eighth Receiver ECM 353—controlled cylinders (i.e. cylinders nos. 4, 5, 2 and 7) have fired or skipped, namely in Pattern B (shown truncated for clarity). In such a way, the Sender ECM 351 and Receiver ECM 353 may be synchronized in order to ensure that the proper fuel delivery rate and fuel injection firing pattern are used. The data message communicated between the Sender ECM 351 and Receiver ECM 353 may include a select protocol or bit pattern to indicate that a new fuel injection firing pattern is to be used. Upon receipt of this select protocol or bit pattern, the Receiver ECM 353 may be adapted to change its fuel injection firing pattern when a select number of engine cycles or a select number of fuel injection firing patterns have been completed.

The number of fuel injectors fired and/or skipped during engine operation may be adaptively adjusted based on current power demand data. Specifically, at start-up and at higher throttle notches (positions) (e.g., throttle notches 3-8), the power demand for the engine is high, thereby requiring higher combustion and increased firing of the fuel injectors. In contrast, at lower throttle notches (e.g., throttle notches 1-2, idle, and dynamic brake operation), the power demand for the engine is low, thereby requiring less combustion and permitting the number of firing fuel injectors to be decreased.

As disclosed herein, the system can be adapted to monitor changing engine power demand. Based on such data or, alternatively, a command from the LCC 340, the ECMs adaptively adjust the number of fuel injectors fired and the number skipped in response thereto. For example, when transitioning from start-up (generally requiring all injectors to fire) to a lower throttle setting (e.g., idle or throttle notches 1-3), the control system may adaptively adjust the firing and/or skipping pattern such that less fuel injectors are fired and more fuel injectors are skipped. When the engine is at a lower throttle setting, the system may adaptively adjust the fuel injection pattern such that a select number and pattern of fuel injectors are skipped. Because fuel is not delivered to all cylinders when a skipping pattern is employed, fuel consumption is decreased and emissions are reduced. When transitioning from lower to higher throttle notches (i.e., throttle notches 3-8), the system may adaptively adjust the firing and/or skipping pattern such that more fuel injectors are fired and less fuel injectors are skipped.

In other embodiments, the number of fuel injectors fired and/or skipped during engine operation may be adaptively adjusted based on engine power demand data in conjunction with data indicative of one or more engine operating conditions and engine environmental conditions, such as ambient air temperature and/or pressure, oil temperature or another parameter indicative of engine temperature, airbox air pressure and/or temperature or another parameter indicative of the charge air density, and the like.

For example, the number of fuel injectors fired and/or skipped during engine operation may be adaptively adjusted based on airbox charge air density, i.e. the density of the air entering the cylinders which, as in the case of turbocharged engines such as shown in FIG. 1, is higher than ambient air density. An increased airbox charge air density within the engine allows for an increased oxygen concentration and more fuel to be injected and combusted in a given cylinder. Because less than the total number of cylinders may be required to provide a required total engine power under these conditions, supplying fuel to all cylinders would result in unnecessary fuel being wasted, and in turn unnecessary emissions being generated. Therefore, as the airbox charge air density increases, the ECMs may be adaptively adjusted to employ a skipping pattern even at high throttle levels. In contrast, a decreased oxygen concentration within the engine may require a greater number of cylinders to be fired to attain the desired total power level. Therefore, as charge air density decreases, the system may be adapted to increase the number of injectors firing, and thus adjust the firing pattern, even at low throttle levels.

In another example, low ambient temperature results in increased oxygen concentration within the engine, which consequently allows for increased charge air and fuel for combustion, and a higher power output per cylinder. Therefore, as ambient temperature decreases, the system may be adapted to employ a skipping pattern at even high throttle levels. Alternatively, as ambient temperature increases, the system may be adapted to increase the number of fuel injectors fired.

In another example, higher altitudes result in decreased oxygen concentration within the engine. Because more engine power is required under these conditions, the system may adaptively transition to a pattern with an increased number of injector firing, when the engine moves into a higher altitude.

In another example, the number of fuel injectors fired and/or skipped during engine operation may be adaptively adjusted based on oil temperature. Oil temperature is an indicator of engine heat. If the engine is cold, it is difficult for combustion to occur and, as a result, to attain adequate engine power. Because all cylinders must work in order to generate necessary engine power in such conditions, the system may be adapted to fire all fuel injectors. On the other hand, even for some reduced power demand conditions that would ordinarily dictate a pattern with some skipping, the engine temperature may be substantially higher than its normal operating condition. In this case, it would be preferable to fire all cylinders so as to not over-burden the working cylinders. Accordingly, the number of fuel injectors fired and/or skipped during engine operation may be adaptively adjusted based on optimal oil temperature.

In yet another feature of the injector control system, when the skipping pattern is initiated, the fuel quantity denied to the skipped cylinders may be added pro rata to the firing cylinders. This has the result of raising the fueling rates in the firing cylinders, which operate more efficiently with the higher fuel rates. For example, when the engine is at less than full load or at certain locomotive operating conditions, the amount of charge air entering the engine may be more than what is necessary for combustion under optimum combustion conditions. This extra charge air will unnecessarily force residual emissions from the scavenging and mixing processes into the exhaust stream. By raising the fueling rates in the firing cylinders, the air/fuel ratio is optimized therein such that fuel is combusted using the extra charge air. As a result, there are less residual emissions in the exhaust stream. Therefore, the present method for skip/fire fuel injection reduces the amount of pollutants by the diesel engine while achieving desired fuel efficiency.

INDUSTRIAL APPLICABILITY

Figure 7:
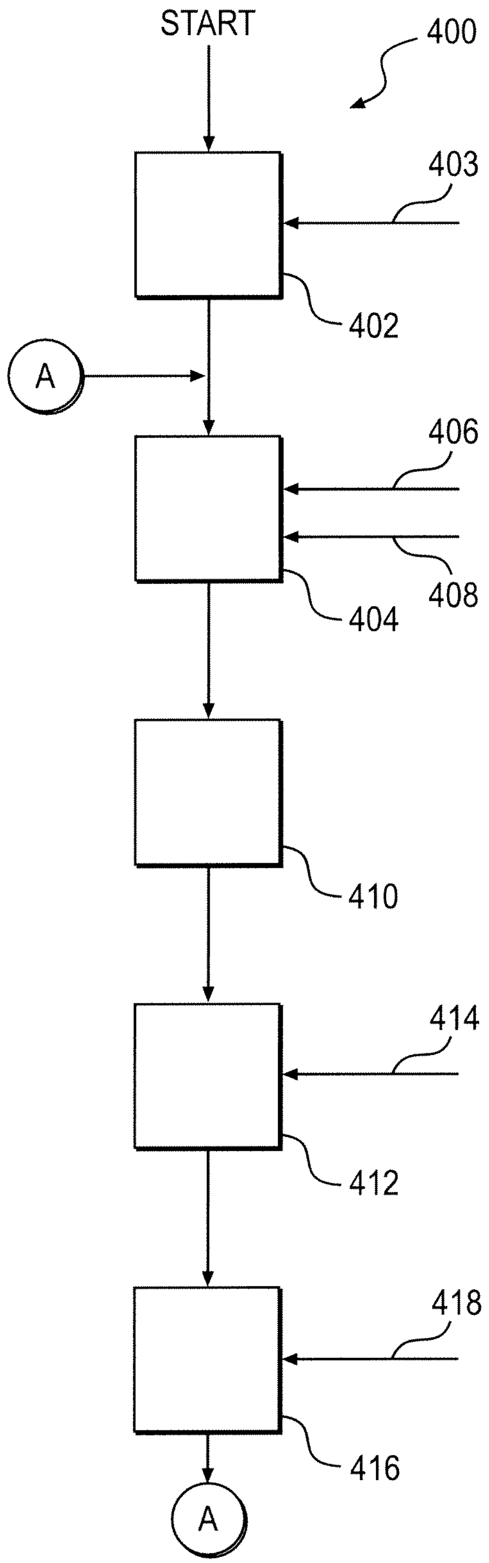
FIG. 7 is a flow chart for a method of controlling fuel injector operation in the engine of FIG. 1.

As stated previously, the system and particularly the method for controlling fuel injectors and internal combustion engine disclosed herein are applicable to the control of engines other than the turbo-charged locomotive two-stroke diesel engine discussed in the proceeding examples. Specifically, other internal combustion engines can have more or fewer of the cylinders and associated fuel injectors than the 16 in the previous discussed locomotive engine example, and include gasoline fueled engines and also four-stroke engines, although the presently disclosed system and method may provide particular benefit for fuel injector control in two-stroke engines where particularly high levels of unburnt particulate matter in the exhaust can occur. FIG. 7 presents a schematic flow chart of the presently disclosed method 400, as will now be discussed in further detail.

In accordance with the disclosure, the method for controlling fuel injectors in internal combustion engine begins with providing at least one electronic engine control module for controlling the fuel injectors (step 402). This providing step includes providing an electronic control module having a memory, and storing pre-determined fuel injector firing and skipping patterns in the memory. The electronic engine control module may also have a CPU with sufficient computing power, and have various algorithms stored in memory for executing the further method elements to be discussed hereinafter. If more than one ECM is provided, one ECM would be designated a “Sender ECM” and the others would be deemed “Receiver ECMs”, for purposes of control and synchronization of the fuel injectors, as discussed previously.

The next step in accordance with method 400 includes determining the number of injectors to be fired and the number of injectors to be skipped in a particular engine cycle, or in a series of consecutive cycles when a rotating firing pattern is selected (step 404). As depicted in FIG. 7, this step includes the ECM receiving engine power demand data, particularly data indicating a reduced power demand condition relative to full power or full load, as represented by input 406. Step 404 may also include the ECM receiving various engine operating condition data input designated as 408, such as engine temperature, ambient air temperature and/or pressure, charge air density, etc. As discussed previously, these engine operating conditions can affect the number of injectors to be fired, and the number to be skipped, even in the situation where the reduced power demand otherwise would dictate that more or less fuel injectors would be fired or more or less injectors would be skipped. Step 404 may also include determining the fuel rate for the injectors to be fired, such as adjusting the fuel rate of the injectors to be fired based on the number of injectors to be skipped, as discussed previously.

Further in the accordance with the present disclosure, the next step in FIG. 7 includes selecting the specific fuel injector firing and skipping pattern commensurate with the number of injectors to be fired and skipped in the cycle or series of successive cycles immediately (step 410). The selected pattern may be different from the pattern selected and used in the previous cycle. Also, the selected pattern may be a rotating—type pattern that, over a large number of engine cycles, would cause the total number of times an injector is fired and the total number of times an injector is skipped to be essentially the same for all the injectors in the engine.

Still further in accordance with the present disclosure, the next step that may be included in method 400 relates to calculating the crankshaft angle for firing the specified injectors to be fired (step 412). This calculation may include not only the particular engine crankshaft configuration, but also the use of engine speed (RPM) data 414.

And still further in accordance with the present disclosure, the next step (step 416) includes ordering the injectors controlled by the electronic control module to be fired in the angular sequence and at the calculated crank shaft angles previously calculated in step 412. This step may also include transmitting appropriate firing data, appropriate instructions for the fuel injector firing/skipping pattern, and fuel flow rates to other engine control modules that may be needed to control some of the injectors in the present engine (e.g. such as Receiver ECM 353 shown in FIG. 2). In this respect, step 416 would include the ECM receiving as inputs engine (crankshaft) angle position data depicted as 418. The same data may also be provided by the ECM concurrently to any other electronic control module (i.e. to the “Receiver ECM”) that had been provided at method element 402, as to allow that engine control module to initiate firing (or skipping) as the specific angular firing positions for its injectors are reached.

Subsequently, and as depicted in FIG. 7 by the return path “A”, the method repeats steps 404, 410, 412, 416 for the following engine cycle. As mentioned previously, in the following engine cycle the fuel injector firing/skipping pattern selected in step 410 is selected to be different from the firing/skipping pattern selected in the previous cycle. And, the firing/skipping pattern may be a rotating pattern.

By employing the disclosed skipping pattern based on engine throttle position (power demand), particulate emissions may be reduced. For example, firing fuel into all cylinders would result in unnecessary fuel being wasted and unnecessary emissions being generated when less engine power is required at lower throttle notches. By skipping the firing of a select number of fuel injectors when the engine is at lower throttle notches, corresponding to reduced power demand conditions, the engine conserves fuel and reduces particulate matter emissions.

Accordingly, the present disclosure provides a skip fire fuel injection system and method that may reduce the amount of pollutants (e.g., particulates, nitrogen oxides ($NO_X$) and other pollutants) released by the diesel engine, while achieving desired fuel efficiency. Specifically, the present system and method may reduce $NO_X$ and/or particulate matter emissions from internal combustion engines by selectively and sequentially injecting fuel into a particular number of cylinders. By removing the fuel supply in controlled, changing patterns from specified skipped cylinders, the skipped cylinders are prevented from firing. Because combustion does not occur in the specified cylinders, no exhaust gases carrying pollutants are produced therefrom. As a result, both fuel consumption and emissions may be reduced, and fuel injector fouling and/or wear may be lessened. While this method has been described with reference to certain illustrative aspects, it will be understood that this description shall not be construed in a limiting sense. Rather, various changes and modifications can be made to the illustrative embodiments without departing from the true spirit, central characteristics and scope of the present method, including those combinations of features that are individually disclosed o claimed herein.

What is claimed is:

1. A system for controlling fuel injectors in an internal combustion engine, the engine having a plurality of individual engine cylinders with associated pistons, the pistons being operatively interconnected to a crankshaft, and the cylinders further including a plurality of respective fuel injectors, the system comprising:

at least one electronic engine control module configured to control the fuel injectors, the engine control module having a central processing unit and an associated memory;

one or more predetermined injector firing patterns stored in said engine control module memory, the firing patterns relating to a number of fuel injectors to be fired, and specifying the fuel injectors to be fired and the fuel injectors to be skipped, in an engine cycle under conditions of reduced power demand relative to a predetermined full power demand;

wherein the engine control module is configured to be responsive to data indicative of a reduced power demand condition during engine operation;

wherein for each engine cycle in a succession of cycles under the reduced power demand condition, the engine control module is programmed to (i) determine the number of fuel injectors to be fired based upon the reduced power demand data, (ii) based on the number of injectors to be fired, select from the stored predetermined firing patterns a firing pattern specifying the injectors to be fired and the injectors to be skipped in a given engine cycle, wherein the selected predetermined firing pattern is different from that for an immediately previous engine cycle, and (iii) order the specified fuel injectors to be fired sequentially in accordance with the selected predetermined pattern.

2. The system of claim 1, wherein the engine control module is responsive to data representing the angular position of the crankshaft, and wherein the system further comprises the engine control module being configured to determine a firing angle of the engine cycle at which each specified fuel injector is to be fired.

3. The system of claim 1, wherein the engine control module also is configured to be responsive to data representing one or more engine operating conditions selected from engine temperature, combustion air density, ambient temperature and/or pressure, and engine rpm, the engine control module further being configured to adjust at least one of the determined number of fuel injectors to be fired and the selected predetermined firing pattern based on said engine operating condition data.

4. The system of claim 3, wherein the engine control module is configured to adjust at least one of the determined number of injectors to be fired and the selected fuel injector firing pattern only after the completion of a select number of engine cycles.

5. The system as in claim 1, including the engine control module being configured to adjust the fuel delivery rate to each of the specified injectors to be fired in the predetermined firing pattern, based on the number of fuel injectors to be skipped.

6. The system as in claim 1, wherein the predetermined injector firing patterns are sets of rotating patterns, wherein the rotating patterns repeat after a predetermined number of consecutive cycles such that during the number of consecutive cycles every engine injector will have been skipped the same number of times.

7. The system of claim 1, wherein the one engine control module is a sender engine control module, and wherein one or more receiver engine control modules are provided, each of the sender module and the receiver modules controlling at least one fuel injector, and wherein the sender engine control module determines which of the sender control module fuel injectors and which of the receiver control module fuel injectors are to be fired or skipped in accordance with the selected predetermined firing pattern, and in what sequence.

8. The system as in claim 7, wherein the fuel injector firings of the sender engine control module controlled fuel injectors and the receiver engine control module controlled fuel injectors are synchronized.

9. The system of claim 8, further including the sender engine control module and the receiver engine control module being configured to communicate a data message therebetween, and wherein said data message includes a select protocol to provide said synchronization.

10. A two-stroke diesel engine having the system of claim 7.

11. A method for controlling fuel injectors in an internal combustion engine, the engine having a plurality of individual engine cylinders with associated pistons, the pistons being operatively interconnected to a crankshaft, and the cylinders further including respective fuel injectors, the method comprising:

providing at least one electronic engine control module for controlling the fuel injectors, the engine control module having a central processing unit and an associated memory, said providing including storing in said engine control module memory one or more predetermined injector firing patterns, the firing patterns relating to a number of fuel injectors to be fired, and specifying the fuel injectors to be fired and the fuel injectors to be skipped, in an engine cycle under conditions of reduced power demand relative to a predetermined full power level;

monitoring engine power demand during operation for a reduced power demand condition and providing data thereof to the engine control module; and for each engine cycle in a succession of cycles under the reduced power demand condition, the engine control module;

(i) determining the number of fuel injectors to be fired based upon the reduced power demand data, (ii) based on the number of injectors to be fired, selecting from the stored predetermined firing patterns, a firing pattern specifying the injectors to be fired and the injectors to be skipped in a given engine cycle, wherein the selected predetermined firing pattern is different from that for an immediately previous engine cycle, and (iii) ordering the specified fuel injectors to be fired sequentially in accordance with the selected predetermined pattern.

12. The method of claim 11, further including monitoring the angular position of the crankshaft, and wherein the method further comprises the engine control module determining firing angles of the engine cycle at which each specified fuel injector is to be fired, and wherein the ordering includes ordering the specified injectors to be fired at respective angular positions.

13. The method of claim 11, wherein the monitoring includes additionally monitoring one or more engine operating conditions selected from engine temperature, combustion air density, temperature and/or pressure, and engine rpm and providing data thereon to the engine control module, and the method further includes adjusting at least one of the determined number of fuel injectors to be fired and the selected predetermined firing pattern based on said engine operating condition data.

14. The method of claim 13 wherein the adjusting at least one of the determined number of injectors to be fired and the selected fuel injector firing pattern occurs only after the completion of a predetermined number of engine cycles.

15. The method as in claim 11, including the engine control module adjusting the fuel delivery rate to each of the specified injectors to be fired in the predetermined firing pattern based on the number of fuel injectors to be skipped.

16. The method as in claim 11, wherein the predetermined injector firing patterns are sets of rotating patterns, wherein the rotating patterns repeat after a predetermined number of cycles such that during the predetermined number of cycles every engine injector will have been skipped the same number of times.

17. The method of claim 11, wherein the one engine control module is a sender engine control module, and wherein one or more receiver engine control modules are provided, each of the sender module and the receiver modules controlling at least one fuel injector, and wherein the ordering includes the sender engine control module determining which of the sender control module fuel injectors and which of the receiver control module fuel injectors are to be fired or skipped in accordance with the selected predetermined firing pattern.

18. The method as in claim 17, further including synchronizing the fuel injector firings of the sender engine control module controlled fuel injectors and the receiver engine control module controlled fuel injectors.

19. The method of claim 18, further including communicating a data message between the sender engine control module and the receiver engine control module, wherein said data message includes a select protocol to provide synchronization.

20. A system for controlling fuel injectors in a diesel engine, the engine having a plurality of individual engine cylinders with associated pistons, the pistons being operatively interconnected to a crankshaft, and the cylinders further including a plurality of respective fuel injectors, the system comprising:

at least one electronic engine control module configured to control the fuel injectors, the engine control module having a central processing unit and an associated memory;

one or more predetermined injector firing patterns stored in the engine control module memory, the firing patterns relating to a number of fuel injectors to be fired, and specifying the fuel injectors to be fired, and the fuel injectors to be skipped, in an engine cycle under conditions of reduced power demand relative to a predetermined full power demand;

wherein the engine control module is configured to be responsive to data of a reduced power demand condition and to data of engine crankshaft angular position during engine operation;

wherein for each engine cycle in a succession of cycles under the reduced power demand condition, the engine control module is programmed to:

(i) determine the number of fuel injectors to be fired based upon the reduced power demand data, (ii) determine the fuel rate for the specified injectors to be fired based on the number of injectors to be skipped, (iii) based on the number of injectors to be fired, select from the stored predetermined firing patterns, a firing pattern specifying the injectors to be fired and the injectors to be skipped in a given engine cycle, (iv) determine the angular positions at which the specified injectors are to be fired, and (v) order the specified fuel injectors to be fired sequentially in accordance with the selected predetermined pattern and engine angular position data.

* * * * *